(12) United States Patent
Nelson et al.

(10) Patent No.: US 7,664,401 B2
(45) Date of Patent: Feb. 16, 2010

(54) APPARATUS, SYSTEM AND METHODS FOR MODIFYING OPERATING CHARACTERISTICS OF OPTOELECTRONIC DEVICES

(75) Inventors: Stephen Nelson, Cupertino, CA (US); Rudolf J. Hofmeister, Escondido, CA (US); Lewis Aronson, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 505 days.

(21) Appl. No.: 10/884,334

(22) Filed: Jul. 3, 2004

(65) Prior Publication Data

US 2005/0111845 A1    May 26, 2005

Related U.S. Application Data

(63) Continuation-in-part of application No. 10/697,395, filed on Oct. 30, 2003, which is a continuation-in-part of application No. 10/420,027, filed on Apr. 17, 2003.

(60) Provisional application No. 60/410,509, filed on Sep. 13, 2002, provisional application No. 60/391,877, filed on Jun. 25, 2002, provisional application No. 60/422,806, filed on Oct. 30, 2002.

(51) Int. Cl.
*H04B 10/00* (2006.01)
(52) U.S. Cl. ...................... 398/138; 398/135
(58) Field of Classification Search ................. 398/135, 398/138, 173, 140, 136, 139, 137, 128, 130
See application file for complete search history.

(56) References Cited

U.S. PATENT DOCUMENTS

| | | | |
|---|---|---|---|
| 4,359,553 A | 11/1982 | Edwards |
| 4,378,451 A | 3/1983 | Edwards |
| 4,489,477 A | 12/1984 | Chik et al. |
| 4,687,924 A | 8/1987 | Galvin et al. |
| 4,734,914 A | 3/1988 | Yoshikawa |
| 4,747,091 A | 5/1988 | Doi |
| 4,809,286 A | 2/1989 | Kollanyi et al. |
| 4,916,707 A | 4/1990 | Rosenkranz |
| 4,932,038 A | 6/1990 | Windus |
| 5,019,769 A | 5/1991 | Levinson |
| 5,039,194 A | 8/1991 | Block et al. |

(Continued)

FOREIGN PATENT DOCUMENTS

DE    10065034    8/2001

(Continued)

OTHER PUBLICATIONS

Yi Cai et al., "Jitter testing for gigabit serial communication transceivers," Jan.-Feb. 2002, IEEE Design and Test of Computers, vol. 19, Issue 1, pp. 66-74.

(Continued)

*Primary Examiner*—M. R. Sedighian
(74) *Attorney, Agent, or Firm*—Workman Nydegger

(57) ABSTRACT

Systems, devices and methods are disclosed for adjusting the operating characteristic of an optical signal transmitted by an optoelectronic device based on the operational data rate, as is indicated by a 'rate select' signal. The rate select can be generated automatically, or can be transmitted from a host device. One example of an operating characteristic that can be adjusted is the optical modulation level of the transmitted signal.

13 Claims, 7 Drawing Sheets

U.S. PATENT DOCUMENTS

| | | | |
|---|---|---|---|
| 5,041,491 A | 8/1991 | Turke et al. | |
| 5,268,949 A | 12/1993 | Watanabe et al. | |
| 5,287,375 A | 2/1994 | Fujimoto | |
| 5,334,826 A | 8/1994 | Sato et al. | |
| 5,383,208 A | 1/1995 | Queniat et al. | |
| 5,392,273 A | 2/1995 | Masaki et al. | |
| 5,396,059 A | 3/1995 | Yeates | |
| 5,448,629 A | 9/1995 | Bosch et al. | |
| 5,495,358 A | 2/1996 | Bartig et al. | |
| 5,516,563 A | 5/1996 | Schumann et al. | |
| 5,557,437 A | 9/1996 | Sakai et al. | |
| 5,574,435 A | 11/1996 | Mochizuki | |
| 5,576,877 A | 11/1996 | Aulet et al. | |
| 5,586,123 A | 12/1996 | Baker | |
| 5,594,748 A | 1/1997 | Jabr | |
| 5,604,758 A | 2/1997 | AuYeung et al. | |
| 5,673,282 A | 9/1997 | Wurst | |
| 5,706,277 A | 1/1998 | Klink | |
| 5,748,672 A | 5/1998 | Smith et al. | |
| 5,761,216 A | 6/1998 | Sotome et al. | |
| 5,787,114 A | 7/1998 | Ramamurthy et al. | |
| 5,801,866 A | 9/1998 | Chan et al. | |
| 5,802,073 A | 9/1998 | Platt | |
| 5,812,572 A | 9/1998 | King et al. | |
| 5,854,704 A | 12/1998 | Grandpierre | |
| 5,920,414 A | 7/1999 | Miyachi et al. | |
| 5,926,303 A | 7/1999 | Giebel et al. | |
| 5,953,690 A | 9/1999 | Lemon et al. | |
| 5,956,168 A | 9/1999 | Levinson et al. | |
| 5,966,395 A | 10/1999 | Ikeda | |
| 5,978,417 A | 11/1999 | Baker et al. | |
| 5,999,294 A * | 12/1999 | Petsko | 398/115 |
| 6,049,413 A | 4/2000 | Taylor | |
| 6,055,252 A | 4/2000 | Zhang | |
| 6,064,501 A | 5/2000 | Roberts et al. | |
| 6,075,634 A | 6/2000 | Casper et al. | |
| 6,157,022 A | 12/2000 | Maeda et al. | |
| 6,160,647 A | 12/2000 | Gilliland et al. | |
| 6,175,434 B1 | 1/2001 | Feng | |
| 6,188,059 B1 | 2/2001 | Nishlyama et al. | |
| 6,198,558 B1 | 3/2001 | Graves et al. | |
| 6,205,505 B1 | 3/2001 | Jau et al. | |
| 6,215,565 B1 | 4/2001 | Davis et al. | |
| 6,222,660 B1 | 4/2001 | Traa | |
| 6,229,788 B1 | 5/2001 | Graves et al. | |
| 6,252,692 B1 | 6/2001 | Roberts | |
| 6,256,127 B1 | 7/2001 | Taylor | |
| 6,272,154 B1 | 8/2001 | Bala et al. | |
| 6,292,497 B1 | 9/2001 | Nakano | |
| 6,313,459 B1 | 11/2001 | Hoffe et al. | |
| 6,317,232 B1 | 11/2001 | Fee et al. | |
| 6,384,948 B1 | 5/2002 | Williams et al. | |
| 6,423,963 B1 | 7/2002 | Wu | |
| 6,466,886 B1 | 10/2002 | Marmur | |
| 6,469,782 B1 | 10/2002 | Schaepperle | |
| 6,473,224 B2 | 10/2002 | Dugan et al. | |
| 6,476,949 B1 | 11/2002 | Loh et al. | |
| 6,512,617 B1 | 1/2003 | Tanji et al. | |
| 6,519,255 B1 | 2/2003 | Graves | |
| 6,526,076 B2 | 2/2003 | Cham et al. | |
| 6,538,783 B1 | 3/2003 | Stephens | |
| 6,570,149 B2 | 5/2003 | Maruyama et al. | |
| 6,594,050 B2 | 7/2003 | Jannson et al. | |
| 6,631,144 B1 | 10/2003 | Johansen | |
| 6,631,146 B2 | 10/2003 | Pontis et al. | |
| 6,643,472 B1 | 11/2003 | Sakamoto et al. | |
| 6,661,836 B1 | 12/2003 | Dalal et al. | |
| 6,661,973 B1 | 12/2003 | Huber et al. | |
| 6,665,498 B1 | 12/2003 | Jiang et al. | |
| 6,694,462 B1 | 2/2004 | Reiss et al. | |
| 6,712,527 B1 | 3/2004 | Chan et al. | |
| 6,748,181 B2 | 6/2004 | Miki et al. | |
| 6,765,445 B2 | 7/2004 | Perrott et al. | |
| 6,829,436 B2 | 12/2004 | Koh et al. | |
| 6,832,052 B1 | 12/2004 | Marmur | |
| 6,909,848 B2 * | 6/2005 | Kim et al. | 398/27 |
| 6,937,949 B1 | 8/2005 | Fishman et al. | |
| 6,941,077 B2 | 9/2005 | Aronson et al. | |
| 6,944,404 B2 | 9/2005 | Lange et al. | |
| 6,952,531 B2 | 10/2005 | Aronson et al. | |
| 6,956,847 B2 | 10/2005 | Heston et al. | |
| 6,977,517 B2 | 12/2005 | Miao et al. | |
| 7,010,030 B2 | 3/2006 | Vaidyanathan | |
| 7,019,548 B2 | 3/2006 | Miao et al. | |
| 7,020,567 B2 | 3/2006 | Fishman et al. | |
| 7,024,059 B2 | 4/2006 | Kurchuk | |
| 7,031,615 B2 | 4/2006 | Gentile | |
| 7,058,310 B2 | 6/2006 | Aronson et al. | |
| 7,099,382 B2 | 8/2006 | Aronson et al. | |
| 7,110,668 B2 | 9/2006 | Gerstel et al. | |
| 7,155,127 B2 * | 12/2006 | Akimoto et al. | 398/72 |
| 7,245,638 B2 | 7/2007 | Agazzi et al. | |
| 7,308,060 B1 | 12/2007 | Wall | |
| 7,437,079 B1 | 10/2008 | Hofmeister | |
| 7,477,847 B2 | 1/2009 | Hofmeister et al. | |
| 2001/0046242 A1 | 11/2001 | Kawakami et al. | |
| 2001/0046243 A1 | 11/2001 | Schie | |
| 2002/0021468 A1 * | 2/2002 | Kato et al. | 359/152 |
| 2002/0027688 A1 | 3/2002 | Stephenson | |
| 2002/0034222 A1 | 3/2002 | Buchwald et al. | |
| 2002/0060824 A1 | 5/2002 | Liou et al. | |
| 2002/0075981 A1 | 6/2002 | Tang et al. | |
| 2002/0080447 A1 | 6/2002 | Fells et al. | |
| 2002/0097468 A1 | 7/2002 | Mecherle et al. | |
| 2002/0097682 A1 | 7/2002 | Enam et al. | |
| 2002/0101641 A1 | 8/2002 | Kurchuk | |
| 2002/0105982 A1 | 8/2002 | Chin et al. | |
| 2002/0110157 A1 | 8/2002 | Jorgenson et al. | |
| 2002/0114061 A1 | 8/2002 | Naito et al. | |
| 2002/0129379 A1 | 9/2002 | Levinson et al. | |
| 2002/0131132 A1 | 9/2002 | Tanaka et al. | |
| 2002/0149812 A1 | 10/2002 | Hong et al. | |
| 2002/0149821 A1 | 10/2002 | Aronson et al. | |
| 2002/0163960 A1 | 11/2002 | Blodgett et al. | |
| 2002/0176518 A1 | 11/2002 | Xu | |
| 2002/0181519 A1 | 12/2002 | Vilhelmsson et al. | |
| 2002/0181573 A1 | 12/2002 | Dohmen et al. | |
| 2002/0181894 A1 | 12/2002 | Gilliland et al. | |
| 2003/0002108 A1 | 1/2003 | Ames et al. | |
| 2003/0011847 A1 | 1/2003 | Dai et al. | |
| 2003/0039207 A1 | 2/2003 | Maeda et al. | |
| 2003/0053170 A1 | 3/2003 | Levinson et al. | |
| 2003/0110509 A1 | 6/2003 | Levinson et al. | |
| 2003/0113118 A1 | 6/2003 | Bartur | |
| 2003/0169790 A1 | 9/2003 | Chieng et al. | |
| 2003/0210917 A1 | 11/2003 | Stewart et al. | |
| 2003/0219085 A1 | 11/2003 | Endres et al. | |
| 2004/0033079 A1 | 2/2004 | Sheth et al. | |
| 2004/0076113 A1 | 4/2004 | Aronson et al. | |
| 2004/0076114 A1 | 4/2004 | Miriello | |
| 2004/0076119 A1 | 4/2004 | Aronson et al. | |
| 2004/0091028 A1 | 5/2004 | Aronson et al. | |
| 2004/0120720 A1 | 6/2004 | Chang et al. | |
| 2004/0153913 A1 | 8/2004 | Fishman et al. | |
| 2004/0202210 A1 | 10/2004 | Thornton | |
| 2004/0240886 A1 | 12/2004 | Aronson et al. | |
| 2004/0253003 A1 | 12/2004 | Farmer et al. | |
| 2005/0031352 A1 | 2/2005 | Light et al. | |
| 2005/0058455 A1 | 3/2005 | Aronson et al. | |
| 2005/0111845 A1 | 5/2005 | Nelson et al. | |
| 2005/0169585 A1 | 8/2005 | Aronson et al. | |
| 2005/0213982 A1 * | 9/2005 | Weber | 398/135 |
| 2005/0281193 A1 | 12/2005 | Hofmeister et al. | |

| | | |
|---|---|---|
| 2007/0031153 A1 | 2/2007 | Aronson et al. |

FOREIGN PATENT DOCUMENTS

| | | |
|---|---|---|
| EP | 0437161 | 6/1996 |
| EP | 0437161 B1 | 6/1996 |
| EP | 0745868 B1 | 4/2002 |
| EP | 1503232 | 7/2004 |
| EP | 02704344 | 10/2004 |
| EP | 04017254 | 10/2004 |
| EP | 1471671 A2 | 12/2004 |
| GB | 2406988 | 4/2005 |
| GB | 0600513.6 | 5/2006 |
| GB | 0600513.6 | 11/2006 |
| GB | 0600513.6 | 4/2007 |
| JP | 58140175 A | 8/1983 |
| JP | 62124576 A | 6/1987 |
| JP | 62235975 A | 10/1987 |
| JP | 62281485 A | 12/1987 |
| JP | 402102589 A | 4/1990 |
| JP | 404023173 A | 1/1992 |
| JP | 06209209 A | 7/1994 |
| JP | 08-321825 | 3/1996 |
| JP | 09162811 A | 6/1997 |
| JP | 11-275016 | 8/1999 |
| JP | 2004135106 | 4/2004 |
| KR | 10-2006-7001640 | 12/2006 |
| TW | 555297 | 9/2003 |
| TW | 224406 | 11/2004 |
| WO | WO 98/00893 | 1/1998 |
| WO | WO 98/00943 | 8/1998 |
| WO | PCT/US02/03226 | 5/2002 |
| WO | WO 02/063800 A1 | 8/2002 |
| WO | WO/2004/098100 | 11/2004 |
| WO | 2005006575 | 1/2005 |

OTHER PUBLICATIONS

Maeda, Noriyuki "Notification of Reason(s) for Refusal," Japanese Patent Application No. JP2002-563630, Nakamura, M. et al., Jul. 13, 2005.
Finisar Corp., "App. Note AN-2025: Using the Finisar GBIC I²C Test Diagnostics Port," 1998.
Husdorf, Reiner, "Mobile Transceiver Measurements with Radiocommunication Service Monitor CMS," News from Rohde & Schwarz, 127, IV, 1989, pp. 4-7.
Documentation entitled "IR Receiver ASSP: T2525", copyright 2003 by Atmel Corportion.
Documentation entitled "IR Receiver for Data Communication: U2538B", copyright 2003 by Atmel Corporation.
Documentation entitled "Low-Voltage Highly Selective IR Receiver IC: T2527", copyright 2002 by Atmel Corporation.
Documentation entitled "Application Note: T2525/26/27", copyright 2003 by Atmel Corporation.
*Optiport SFF BiDi-Transceiver 100 Mbit/s, 1310 nm Tx/1550 nm Rx*, Infineon Technologies, Jun. 22, 2004, pp. 1-14.
U.S. Appl. No. 10/629,301, filed Jul. 28, 2003, Tranceiver Module and Integrated Circuit with Multi-Rate Eye Openers and Bypass.
*LXT16706/16707 SerDes Chipset*, Intel Products, www.intel.com/design/network/products/optical/phys/lxt16706.htm, Apr. 19, 2002.
*LXT35401 XAUI-to-Quad 3.2G Transceiver*, Intel Products, www.intel.com/design/network/products/optical/phys/lxt35401.htm, Apr. 19, 2002.
Texas Instruments User's Guide, *TLK2201 Sedes EVM Kit Setup and Usage*, Mixed Signal DSP Solutions, Jul. 2000.
Texas Instruments User's Guide, *TLK1501 Serdes EVM Kit Setup and Usage*, Mixed Signal Products, Jun. 2000.
National Semiconductor DS92LV16 Design Guide, *Serializing Made Simple*, Feb. 2002.
Vaishali Semiconductor, *Fibre Channel Transceiver*, VN16117, MDSN-0002-02, Aug. 9, 2001.
Fairchild Semiconductor, Application Note 77, *CMOS, the Ideal Logic Family*, Jan. 1983.
Analog Target Specification, Annex 48B, Published by IEEE New York, May 2001, pp. 6-14.
U.S. Appl. No. 10/697,395, filed Oct. 30, 2003, Hofmeister et al.
Dallas Semiconductor, "HFTA-01.0 2.5Gbps SDH/SONET Fiber Optic Chipset," 4 pgs, Oct. 10, 2000 http://www.maxim-ic.com/appnotes.cfm/appnote_number/713/1n/en.
Dallas Semiconductor, "MAX3872 Multirate Clock and Data Recovery with Limiting Amplifier", 2 pgs, Mar. 30, 2003. http://www.maxim-ic.com/quick_view2.cfm/qv_pk/3705.
Finisar XFP Achieves 300m Transmission on Legacy Multimode Fiber, Finisar News Release, Sunnyvale, California Sep. 17, 2003. http://investor.finisar.com/ReleaseDetail.
GIGA an Intel Company, "2.5 Gbit/s Clock and Data Recovery GD16546B", 9 pgs, Jul. 31, 2001.
Green, Michael, et al., "Mixing it up with OC-192 CMOS Transceivers", CommsDesign, An EE Times Community, 8 pgs., May 3, 2006. http://www.commsdesign.com/main/2000/12/0012feat6.htm.
Huiqing Zhong and Stephen I. Long, "Monothic Clock and Data Recovery Chip for 10GB/S Fiber Communications Systems", 4 pgs 1997-98.
Kaminishi, K. et al., Si Bipolar 3.3V Transmitter/Receiver IC Chip Set for 1Gb/s 12-Channel Parallel Optical Interconnects, IEEE International Solid-State Circuits Conference, ISSCC, Digest of Technical Papers, 1999 Paper WP 22.1.
XFP MSA Group, About the 10 Gigabit Small Form Factor Pluggable (XFP) Multi Source Agreement (MSA) Group. Feb. 11, 2004. www.xfpmsa.org/cgi-bin/home.cgi.
XFP MSA Group, New Module to Slash Cost, Power and Size of Telecommunications and Data Communications Equipment, Press Release, Costa Mesa, California, Jul. 22, 2002. www.xfpmsa.org/cgi-bin/pressrelease3.cgi.
XFP MSA Group, Ultra Small, 10-Gigabit Module Slashes Cost, Power and Footprint of Telecommunications and Datacommunications Equipment, Press Release, Irvine, California, Mar. 4, 2002. www.xfpmsa.org/cgi-bin/pressrelease1.cgi.
Manchester Encoding [retrieved Nov. 12, 2003 from the Internet]. http://www.erg.abdn.ac.uk/users/gorry/course/phy-pages/man.html.
Webopedia.com: I2C [retrieved Nov. 11, 2003 from the Internet] http://www.webopedia.com/TERM/I/12C.html.
Webopedia.com: MAC Address [retrieved Oct. 15, 2003 from the Internet] http://www.webopedia.com/TERM/M/MAC_address.html.
Webopedia.com: Public-Key Encryption [retrieved Oct. 15, 2003 from the Internet] http://www.webopedia.com/Term/p/public_key_cryptography.html.
Webopedia: The 7 Layers of the OSI Model [retrieved Oct. 15, 2003 from the Internet] http://webopedia.internet.com/quick_ref/OSI_Layers.asp.
U.S. Appl. No. 10/420,027, Mail Date Jan. 25, 2006, Office Action.
U.S. Appl. No. 10/420,027, Mail Date Sep. 7, 2006, Office Action.
U.S. Appl. No. 10/420,027, Mail Date May 16, 2007, Office Action.
U.S. Appl. No. 10/629,228, Mail Date Jan. 24, 2006, Office Action.
U.S. Appl. No. 10/629,228, Mail Date Sep. 1, 2006, Office Action.
U.S. Appl. No. 10/629,228, Mail Date May 24, 2007, Office Action.
U.S. Appl. No. 10/629,301, Mail Date Aug. 9, 2007, Office Action.
U.S. Appl. No. 10/629,302, Mail Date Jun. 14, 2007, Office Action.
U.S. Appl. No. 10/629,725, Mail Date Oct. 17, 2005, Office Action.
U.S. Appl. No. 10/629,725, filed Apr. 11, 2006, Notice of Allowance.
U.S. Appl. No. 10/697,395, filed Jan. 24, 2006, Office Action.
U.S. Appl. No. 10/697,395, filed Sep. 27, 2006, Office Action.
U.S. Appl. No. 10/697,395, filed May 9, 2007, Office Action.
U.S. Appl. No. 10/697,395, filed Nov. 15, 2007, Office Action.
A. Ghiasi, "'XFP' The Module Based 10Gig Universal Serial Interconnect 'XFI'", presentation material, Apr. 8, 2002.
U.S. Appl. No. 10/626,965, Mail Date Aug. 7, 2006, Office Action.
U.S. Appl. No. 10/626,965, Mail Date Jan. 24, 2007, Office Action.
U.S. Appl. No. 10/626,965, Mail Date Aug. 9, 2007, Office Action.
U.S. Appl. No. 10/420,027, Mail Date Dec. 12, 2007, Office Action.
U.S. Appl. No. 11/073,452, Mail Date Dec. 31, 2007, Office Action.
U.S. Appl. No. 10/629,228, Mail Date Jan. 3, 2008, Office Action.
U.S. Appl. No. 10/626,965, Mail Date Mar. 18, 2008, Office Action.
U.S. Appl. No. 11/118,172, Mail Date Mar. 25, 2008, Office Action.
U.S. Appl. No. 10/629,301, Mail Date Apr. 1, 2008, Office Action.

U.S. Appl. No. 10/629,302, Mail Date May 2, 2008, Final Office Action.

U.S. Appl. No. 10/697,395, Mail Date May 30, 2008, Notice of Allowance.

U.S. Appl. No. 10/420,027, Mail Date Jun. 25, 2008, Notice of Allowance.

Hawthorne: "850nm Proton VCSEL Reliability Study" Technical Publications and Application Notes, Advances Optical Components (Finisar Corp), Issue 2, Sep. 2001, pp. 1-7, Richardson, TX.

Mecherle G S et al: "Considerations for Accelerated Laser Diode Life Testing" Proceedings of the Spie, Spie, Bellingham, VA, vol. 717, 1986, pp. 53-62.

Tebbi O et al: "Comparitive study of acclerated testing models, applications in mechanics" 2001 IEEE International Conference on Systems Man and Cybernetics SMC 2001. Tucson, AZ Oct. 7-10, 2001, IEEE International Conference on Systems, Man and Cybernetics, New York, NY: IEEE, US, vol. 1 of 5 Oct. 7, 2001 pp. 2099-2104.

J.D. Barry et al.: Thermally Accelerated Life Testing of Single Mode, Double-Heterostructure, AlGaAs Laser Diodes Operated Pulsed at 50 mW Peak Power IEEE Journal of Quantum Electronics, vol. 21, No. 4 Dec. 25, 1984 pp. 365-376.

U.S. Appl. No. 11/118,172, Mail Date Sep. 4, 2008, Office Action.

U.S. Appl. No. 10/629,302, Mail Date Jan. 25, 2008, Restriction Requirement.

U.S. Appl. No. 10/629,301, Mail Date Nov. 26, 2008, Office Action.

U.S. Appl. No. 11/073,452, Mail Date Aug. 7, 2008, Office Action.

U.S. Appl. No. 10/629,302, Mail Date Nov. 17, 2008, Office Action.

U.S. Appl. No. 11/118,172, Mail Date Mar. 6, 2009, Notice of Allowance.

U.S. Appl. No. 10/629,301, Mail Date Mar. 23, 2009, Notice of Allowance.

U.S. Appl. No. 10/629,301, Mail Date May 1, 2009, Supplemental Notice of Allowance.

U.S. Appl. No. 10/629,302, Mail Date Jun. 24, 2009, Notice of Allowance.

* cited by examiner

APPARATUS, SYSTEM AND METHODS FOR MODIFYING OPERATING CHARACTERISTICS OF OPTOELECTRONIC DEVICES

CROSS-REFERENCE TO RELATED APPLICATIONS

This application is a continuation-in-part of U.S. patent application Ser. No. 10/697,395, "Automatic Selection of Data Rate for Optoelectronic Devices," filed Oct. 30, 2003, which is a continuation-in-part of U.S. patent application Ser. No. 10/420,027, "Transceiver Module and Integrated Circuit With Dual Eye Openers," filed Apr. 17, 2003, which claims the benefit of: U.S. Provisional Patent Application Ser. No. 60/410,509, filed Sep. 13, 2002; and, U.S. Provisional Patent Application Ser. No. 60/391,877, filed Jun. 25, 2002. Additionally, this application claims the benefit of U.S. Provisional Patent Application Ser. No. 60/422,806, entitled "Automatic Selection of Data Rate for Transceivers and Transponders," filed on Oct. 30, 2002. Each of the foregoing patent applications is incorporated herein in its respective entirety by this reference.

BACKGROUND OF THE INVENTION

1. The Field of the Invention

The present invention relates generally to optoelectronic systems and devices. More specifically, embodiments of the present invention relate to modifying operating characteristics of transceivers and transponders.

2. The Related Technology

The proliferation and significance of networking technology is well known. Optical transponders and transceivers are used for receiving and transmitting data between electronic hosts such as computers using an optical network. Generally, optical transceivers/transponders are located at the interface of an optical network and an electronic host. Transceivers and transponders receive optical data signals from the network, convert the optical data signal to an electrical data signal, and pass the electric data signal to the host.

Likewise, optical transceivers and transponders receive data, in the form of an electrical signal, from the host. The transceiver or transponder converts the electrical signal to an optical data signal, and transmits the optical data signal across an optical network to another host. Optical transceivers and transponders are commonly implemented in the form of a combination transceiver/transponder module that can be mounted on a motherboard of a host via an interconnect.

The ever-increasing demand for network bandwidth has resulted in the development of technology that increases the amount of data traveling across a network. Advancements in modulation techniques, coding algorithms and error correction have drastically increased rates of this data type. For example, it was the case at one time that the highest rate that data could travel across a network was at approximately one Gigabit per second ("GB/s"). Subsequently however, data rates of 10 GB/s have been achieved in connection with Ethernet and Synchronous Optical Network ("SONET") networks. For instance, the XFP (10 GB/s serial electrical interface) Pluggable Module Multi-Source Agreement ("MSA") is directed to transceivers operating at approximately 10 Gb/s. Further, data rates of 4 Gb/s have been attained in Fibre Channel ("FC") networks.

As data rates have increased, transceivers and transponders have been designed to be compatible with networks that run at different data rates. For instance, in a Fibre Channel network, it may be desirable to operate at a data rate of about 4, 2, or 1 Gb/s or lower. In a Ethernet or SONET system, the transceiver or transponder may operate at a data rate of about 10, 5, or 1 Gb/s or lower. In yet other systems, it may be desirable to select a single operational data rate, or a range of data rates over which the system will operate. As an example of the latter case, it may be necessary to set a transceiver or transponder to operate at one of several data rates close to 10 Gb/s.

Many existing transceivers and transponders have selectable data rates. Conventionally, a transceiver/transponder module with a selectable data rate will include a data rate select pin that allows the transceiver/transponder module to be configured or set to operate at one of several rates. Thus, transceivers and transponders with selectable data rates allow the transceiver or transponder to be configured for use in various types of networks and network configurations.

However, existing transceivers and transponders are problematic in that they typically require a user to manually select the data rate. The requirement for manual selection of the data rate for the transceiver or transponder limits the ability of the transceiver/transponder to respond to system changes. This limitation can cause problems in some situations, such as by preventing certain networks from working together.

A related problem concerns the fact that an I/O connector, such as a pin on the interconnect between the transceiver/transponder and the host board, is required in some instances to facilitate implementation of the data rate selection or change. Oftentimes, the pin arrangement for a transceiver/transponder module is defined by industry standard, so that a desired new feature or component cannot be added to the transceiver/transponder module if adding that feature would require some type of I/O to control the data rate of operation and/or if no I/O connection is available for the transceiver/transponder module under the existing industry standard.

Therefore, what is needed are optoelectronic components, such as transceivers, transponders, and transceiver/transponder modules for example, whose operational data rate can be automatically selected. Moreover, at least some implementations of such optoelectronic components should be self-contained such that automatic data rate selection can be implemented by the optoelectronic component without regard to the configuration of the associated host board. Alternatively, it would be desirable to provide the ability to modify the operational data rate of a optoelectronic device so as to effect other effect behaviors of the device. For example, manipulation of the data rate of a transmitted signal so that the signal is optimized for a given environment would be desirable.

SUMMARY OF EXAMPLE EMBODIMENTS OF THE INVENTION

In one example embodiment of the present invention, a transceiver/transponder module is provided that includes, among other things, signal modification circuitry. The signal modification circuitry is exemplarily implemented as a clock and data recover ("CDR") integrated circuit ("IC"), or CDR IC, and is configured to operate at a variety of different data rates. In one embodiment, the CDR IC includes an input for receiving an input data stream and an input for selecting the operational data rate of the CDR IC. Among other things, the CDR IC is configured to generate a loss of lock ("LOL") signal when the data rate of the input data stream deviates from the selected data rate of the CDR IC by a predetermined margin.

In this regard, this example embodiment of the transceiver/transponder module further includes a controller that monitors the CDR IC for the LOL signal. Upon sensing the LOL signal, the controller automatically adjusts the selectable data rate of the CDR IC until the LOL signal ceases. In this particular example, the controller, upon detection of a LOL, automatically begins testing a discrete number of possible data rates. If the LOL signal ceases, the controller sets the CDR IC to operate at the selected rate. If all selectable data rates are attempted and the LOL signal persists, the controller sets the data stream to bypass the CDR IC.

It should be noted that in a system designed to operate at a very wide range of data rates, such as between Ethernet rate of 1.25 Gb/s and the 10 Gigabit Ethernet rate of 10.3125 Gb/s, the retiming function in a serial transceiver may only be needed at the higher data rates where it is being used to compensate for signal degradations which are insignificant at the lower data rates. Thus, a system which recognizes the very low rates, by the above process of elimination or otherwise, and ultimately bypasses the retiming function, would be expected to provide totally adequate performance at the much lower data rates. The bypass mode, referred to elsewhere herein, is therefore not a failure mode, but instead a feature of normal operation whereby system operation may be achieved far outside the available data rate range of a given CDR IC.

In yet another embodiment, a 'rate select' signal is utilized to optimize the operating characteristics of the optical transceiver module. In this particular embodiment, a 'rate select' signal is provided to the optical transceiver module, either from a host, or from circuitry on the module itself. The rate select signal indicates the operational data rate for the module. Based on the information gleaned from the rate select signal, operating parameters of the optical signal can be modified so as to optimize the operation of the transceiver module for the given data rate. For example, the modulation level of the transmitted signal may be optimized for the particular data rate. Other signal characteristics could also be modified in response to the rate select signal.

Among other things then, example embodiments of the invention allow optoelectronic devices such as transceivers and transponders to transmit at more than one data rate without the need for manual adjustment of the data rate of the IC. Moreover, such automatic implementation of data rate changes can be accomplished internally within the optoelectronic device, without the need for devices such as I/O connections. In addition, operation of the transceiver device can be optimized, depending on the operational data rate required. The foregoing, and other, aspects of the present invention will become more fully apparent from the following description and appended claims.

BRIEF DESCRIPTION OF THE DRAWINGS

In order that the manner in which the above-recited and other aspects of the invention are obtained, a more particular description will be rendered by reference to specific embodiments thereof which are illustrated in the appended drawings. Understanding that these drawings depict only example embodiments of the invention and are not therefore to be considered limiting of its scope, example embodiments of the invention will be described and explained with additional specificity and detail through the use of the accompanying drawings in which.

DETAILED DESCRIPTION OF EXAMPLE EMBODIMENTS

Example embodiments of the invention are generally concerned with systems and devices for implementing automatic control of the data rate of rate-selectable optical, electrical, and optoelectronic devices. Embodiments of the invention are compatible with a wide variety of data rates and physical protocols, and can be employed in connection with a range of optical, electronic and optoelectronic systems and devices. In various example embodiments, such optical, electrical, and optoelectronic devices are configured to transmit signals over the network at data rates including, but not limited to, about 1.25 Gb/s, about 2 Gb/s, about 2.5 Gb/s, about 4 Gb/s, and about 10 Gb/s. Example protocols with which embodiments of the invention are compatible include, but are not limited to, Gigabit Ethernet, Fibre Channel, and SONET and 10 Gigabit Ethernet.

Among other things, example embodiments of the invention allow optoelectronic devices such as transceivers and transponders to transmit at a variety of different data rates without the need for manual adjustment of the data rate of the IC. Moreover, such automatic implementation of data rate changes can be accomplished internally within the optoelectronic device, without the need for devices such as I/O connections. Further, example embodiments of the invention enable the automatic selection of data rates in transceivers and transponders using various rate-selectable integrated components. For instance, various embodiments of the present invention automatically select the data rates in transceivers/transponders by adjusting the data rate of a CDR, a MUX/DEMUX, a SERDES, or other component or device.

By way of example, in one example embodiment, the IC includes a clock and data recover ("CDR") IC. Generally, the CDR IC is configured to generate the LOL signal when the input data stream is out or range. In another example embodiment, a multiplexer/demultimplexer ("MUX/DEMUX") generates the LOL signal. In a further example embodiment, a serializer/deserializer ("SERDES") generates the LOL signal. In some implementations, the MUX/DEMUX and the SERDES includes a CDR that generates the LOL signal.

Additionally, at least some embodiments are configured so that the IC automatically selects a data rate without instruction or input from a controller or external clock. Exemplarily, the IC includes a CDR that generates a LOL signal when the input data stream is out of range of the selected data rate for the IC.

I. General Aspects of an Example Transceiver/Transponder Module

Figure 1:
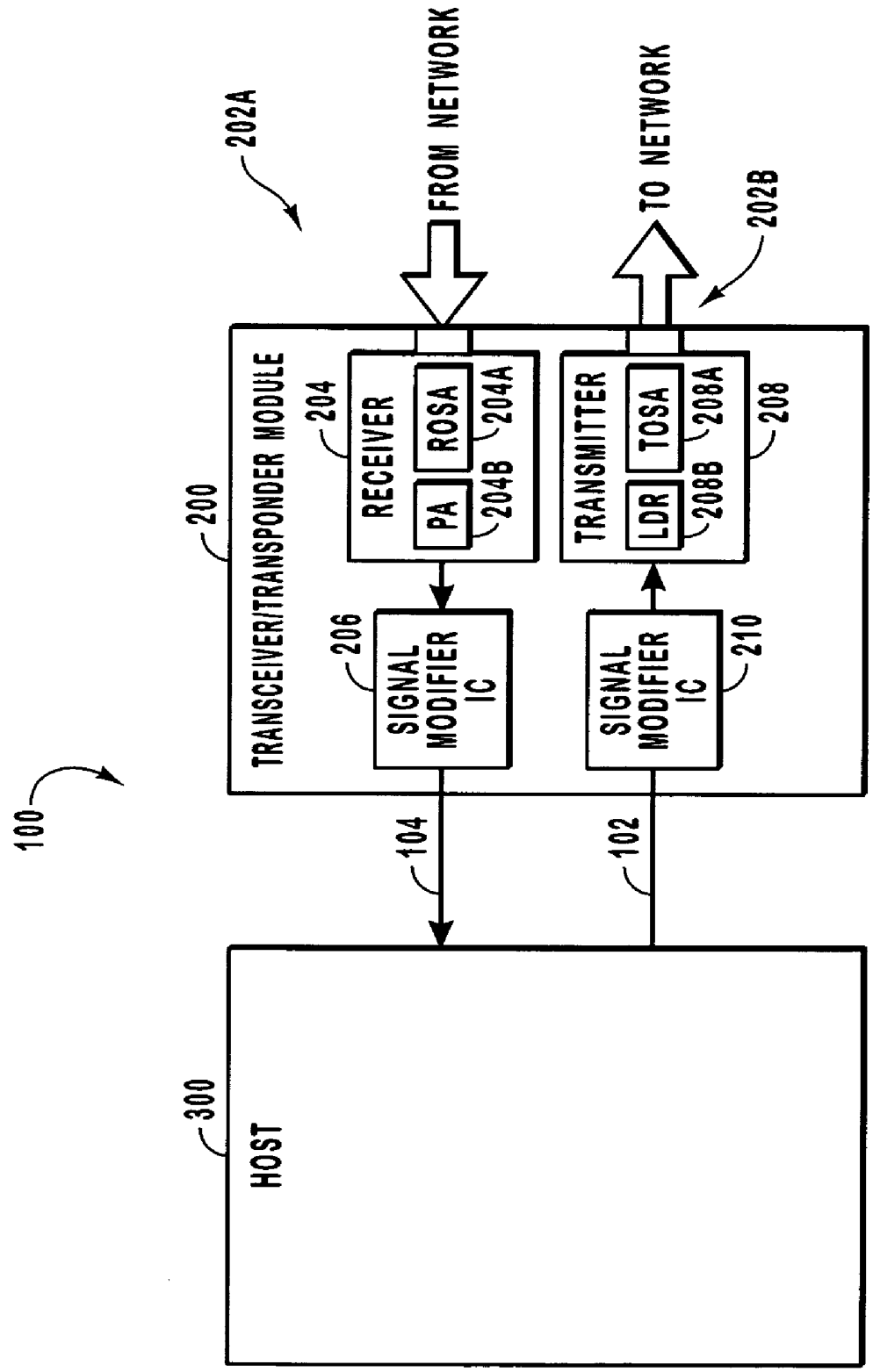
FIG. 1 is a block diagram illustrating aspects of a system that includes a host device configured to communicate with a transceiver/transponder module that enables automatic selection of an operational data rate.

With attention now to FIG. 1, details are provided concerning various aspects of an example system 100 that includes a transceiver/transponder module 200 and host device 300 configured and arranged to interact with each other. Generally, such interaction is facilitated through the use of transmission lines 102 and 104 that electronically connect the transceiver/transponder module 200 with the host device 300. It should be noted that while the illustrated implementation refers to a transceiver/transponder module 200, embodiments of the invention are not so limited. Rather, embodiments of the invention may, more generally, be employed with any other optical, electronic, or optoelectronic device in connection with which it would be desirable to implement the functionality disclosed herein.

Among other things, the transceiver/transponder module 200 defines a 'receive' path 202A and a 'transmit' path 202B. Elements of the 'receive' path 202A include a receiver 204 and a signal modifier IC 206. Generally, the receiver 204 is configured and arranged to receive an optical data signal from a network, or an optical device, and to convert the received optical data signal into an electrical data signal that is then passed to the signal modifier IC 206.

More particularly, the illustrated example embodiment of the receiver 204 includes a receive optical sub-assembly 204A ("ROSA") that receives the optical data signal from the network or optical device and converts the optical data signal to an electrical data signal. Exemplarily, the ROSA comprises a photodiode, but other suitable optoelectronic devices may be employed as well. The receiver 204 also includes a post-amplifier 204B that, in general, serves to amplify, and/or otherwise condition or process, the electrical data signal received from the ROSA 204A. Exemplarily, the signal modifier IC 206 and postamplifier 204B may be combined into a single IC.

With continuing reference to FIG. 1, the transmit path 202B defined by the transceiver/transponder module 200 includes a transmitter 208 coupled to a network and a signal modifier IC 210. Generally, the transmitter 208 is configured and arranged to receive an electrical data signal from a host or other system or device, by way of the signal modifier IC 210, and to convert the received electrical data signal into an optical data signal that is then transmitted onto a network or to an optical device.

More particularly, the illustrated embodiment of the transmitter 208 includes a transmitter optical sub-assembly ("TOSA") 208A that receives, at least indirectly, the electrical data signal from the host 300 or other system or device and converts the electrical data signal to an optical data signal and transmits the optical data signal onto a network or to an optical device. Exemplarily, the TOSA 208A includes a laser diode, but other suitable optoelectronic devices may be employed as well. The transmitter 208 also includes a laser driver 208B that generally serves to control operation of the laser within the TOSA 208A. Such control may extend to, among other things, laser input power, and optical amplitude modulation. The laser within TOSA 208A is also biased to the proper operating current using a dedicated biasing and control circuit that may be contained within, or located outside of, the laser driver 208B.

With continuing attention to FIG. 1, further details are provided concerning the signal modifier IC 206 and signal modifier IC 210 employed in connection with the example implementation of the transceiver/transponder module 200. In particular, the signal modifier IC 206 is positioned between the receiver 204 and the host device 300, while the signal modifier IC 210 is positioned between the transmitter 208 and the host device 300. Typically, the signal modifier ICs 206 and 210 serve to modify or condition the data stream. More particularly, signal modifier ICs 206 and 210 may include a CDR that reshapes and retimes a data stream to perform an eye-opening function. Alternatively, signal modifier ICs 206 and 210 may include a MUX/DEMUX, SERDES, or an adaptive equalizer.

Various factors may be considering in reaching a determination as to which components will be included in a particular implementation of signal modifier ICs 206 and 210. Typically, such determinations are made without reference to the need to toggle between two or more different operational data rates. For instance, industry standards require XBI transponder modules to have multiplexers and SERDES so that the signal can be transmitted to the host board in parallel. XFP type transceiver modules, however, transmit to the host board in serial fashion, in which case multiplexers and SERDES are not required to interface with the host.

One aspect of the example signal modifier ICs 206 and 210 is that they operate at a selectable data rate. As described below with reference to specific example embodiments of the present invention, the signal modifier ICs 206 and 210 are configured to generate a LOL signal. In general, the input data stream to the transceiver/transponder module 200 is determined to be 'out of lock' when the data rate of the input data stream is outside the operational data rate range specified in connection with signal modifier ICs 206 and 210.

It should be noted that the data rate adjustment, and other, functionality implemented in connection with example embodiments of the invention may be performed in connection with software, as discussed in further detail elsewhere herein. Alternatively, at least some of such functionality may be specified and implemented through the use of field programmable gate arrays ("FPGA") or similar devices.

II. Aspects of Example CDR Signal Modification Circuitry

Figure 2:
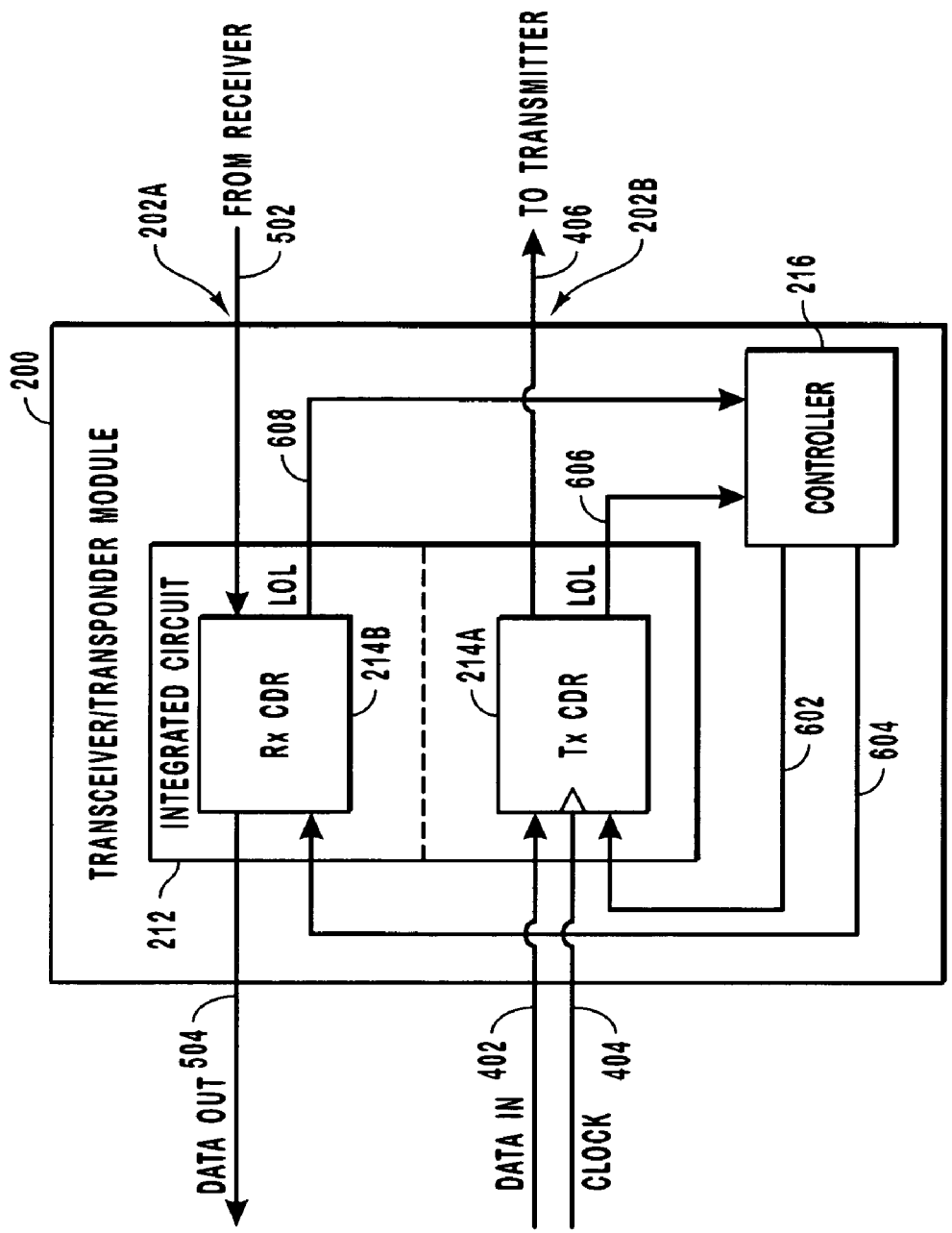
FIG. 2 is a block diagram that illustrates further aspects of the transceiver/transponder module of FIG. 1.

Direction attention now to FIG. 2, details are provided concerning an example implementation of a transceiver/transponder module 200 that incorporates, among other things, automatic data rate selection capabilities. The illustrated embodiment of the transceiver/transponder module 200 includes a signal modifier IC 212 that includes a transmitter clock and data recover ("Tx CDR") 214A and a receiver clock and data recover ("Rx CDR") 214B, each of which is configured to receive various inputs and generate various outputs. It should be noted that Tx CDR 214A and Rx CDR 214B, and IC 212, and other circuitry of transceivers/transponders may be integrated on a single IC, or configured as discrete components, as suggested by the phantom line in FIG. 2.

In general, Tx CDR 214A and Rx CDR 214B perform an eye-opening function for a transmitter input data stream 402 (see below) or a receiver output data stream 504 (see below). Further, the Tx CDR 214A and Rx CDR 214B retime and reshape data pulses. Finally, each of the Tx CDR 214A and Rx CDR 214B may include various sub-circuits for providing data at specific data rates.

With more particular reference now to FIG. 2, the Tx CDR 214A is configured to receive a data input 402 from the host 300 (see FIG. 1), as well as a reference clock input 404. Generally, the Tx CDR 214A uses the reference clock input 404 to center the frequency used to recover the clock and data from an input data stream. In some implementations, the reference clock input 404 is shared by Tx CDR 214A and Rx CDR 214B, thereby reducing the number of components on IC 212 and reducing the complexity and cost of the transceiver/transponder module 200. In addition to the foregoing, the Tx CDR 214A generates a data output 406 to transmitter 208 (see FIG. 1).

With continuing reference to FIG. 2, the Rx CDR 214B receives, on the receive path 202A, an input 502 from the receiver 204 (FIG. 1). The Rx CDR 214B also generates a data output 504. As discussed in further detail below, 'data rate select' pins 602 and 604 couple a controller 216 to Tx CDR 214A and Rx CDR 214B, respectively.

More particularly, the respective data rate pins 602 and 604 enable selection of an operational data rate. If the data rate of the input data stream 402 is out of the range of the selected data rate of Tx CDR 214A and Rx CDR 214B, the Tx CDR 214A and/or Rx CDR 214B, as applicable, generates a loss of lock ("LOL") signal. However, if Tx CDR 214A or Rx CDR 214B is locked, no LOL signal is generated for the respective CDR. In the example arrangement illustrated in FIG. 2, the controller 216, exemplarily implemented as a microprocessor controller, monitors Tx CDR 214A and Rx CDR 214B for a respective LOL signal on pins 606 or 608. The Tx CDR 214A and the Rx CDR 214B can generate a LOL signal using a phase locked loop ("PLL") or any other circuitry, system or device that indicates loss of lock on a signal.

In addition to implementing various monitoring functionalities, the controller 216 also provides control signals to the data rate select pins 602 and 604 of Tx CDR 214A and Rx CDR 214B, respectively. In at least some implementations, the controller 216 maintains the current data rate as a default as long as there is no LOL signal transmitted on pins 606 or 608. However, in response to detecting LOL signal on pin 606 or 608, controller 216 resets the target data rate to test a new data rate. In the event that the LOL signal transmitted on pins 606 or 608 ceases, thereby indicating a correct selected data rate, controller 216 will maintain the new data rate.

On the other hand, if the LOL signal transmitted on pins 606 or 608 persists, the controller 216 tests another data rate. The process of sensing the LOL signal transmitted on pins 606 or 608 and resetting the data rate continues until either an appropriate data rate has been selected or all data rates have been attempted. In one embodiment, if all data rates generate a LOL signal, the data stream 402 and/or 502, as applicable, is passed through the IC 212 without clock and data recovery.

Thus, the controller 216 obviates the need for a user to set and/or select operational data rates. As a result, example embodiments of the invention are well suited for use in connection with systems and devices where data rates can vary.

It should be noted that in the example embodiments illustrated in FIGS. 2 and 3 (below), the controller 216 and 708, respectively, is included as an element of the transceiver/transponder module. More generally however, the controller may be disposed external to the module in some embodiments. Alternatively, the controller can be integrated onto the same chips as the IC. In yet other implementations, no controller is required. An example of one such implementation is considered below in connection with the discussion of FIG. 4. Accordingly, the scope of the invention should not be construed to be limited to the example illustrated embodiments.

III. Aspects of Example MUX/DEMUX Signal Modification Circuitry

As noted earlier herein, signal modification circuitry directed to automatic implementation of data rate changes and associated functionality can be implemented in a variety of different forms. With attention now to FIG. 3, a transceiver/transponder module 700 is illustrated that includes an IC 702. In this example embodiment, transceiver/transponder module 700 further includes a MUX 704, DEMUX 706, both of which are configured for communication with a controller 708. Both the MUX 704 and DEMUX 706 are configured to receive various inputs and generate various outputs. It should be noted that the MUX 704 and DEMUX 706, and IC 702, and other circuitry of transceivers/transponders may be integrated on a single IC, or configured as discrete components, as suggested by the phantom line in FIG. 3. In general, and as discussed in further detail below, the MUX 704 and DEMUX 706 serve to multiplex and demultiplex, respectively, data streams associated with the transceiver/transponder module 700.

Figure 3:
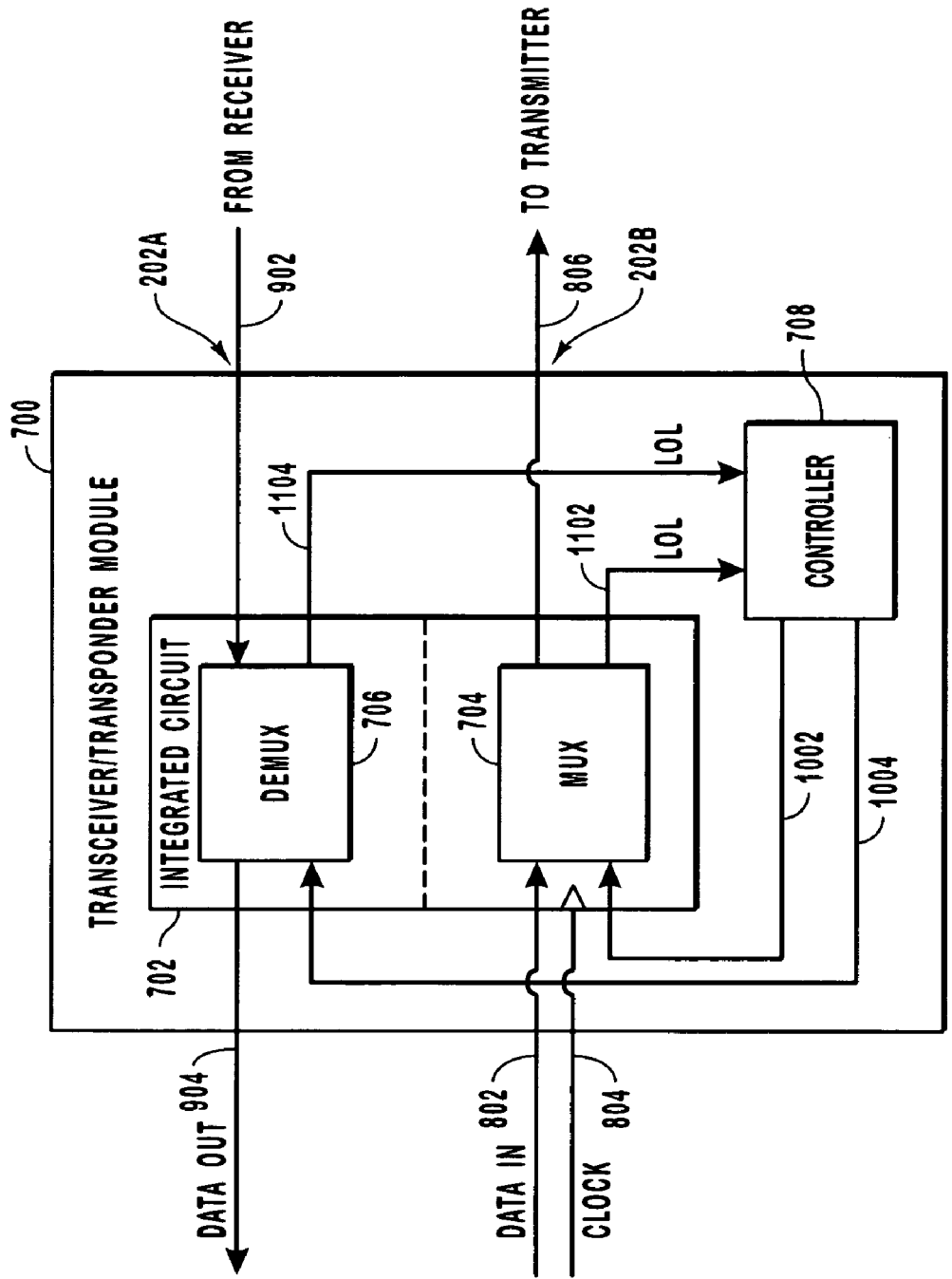
FIG. 3 is a block diagram of an alternative implementation of a transceiver/transponder module that enables automatic selection of an operational data rate.
Figure 4:
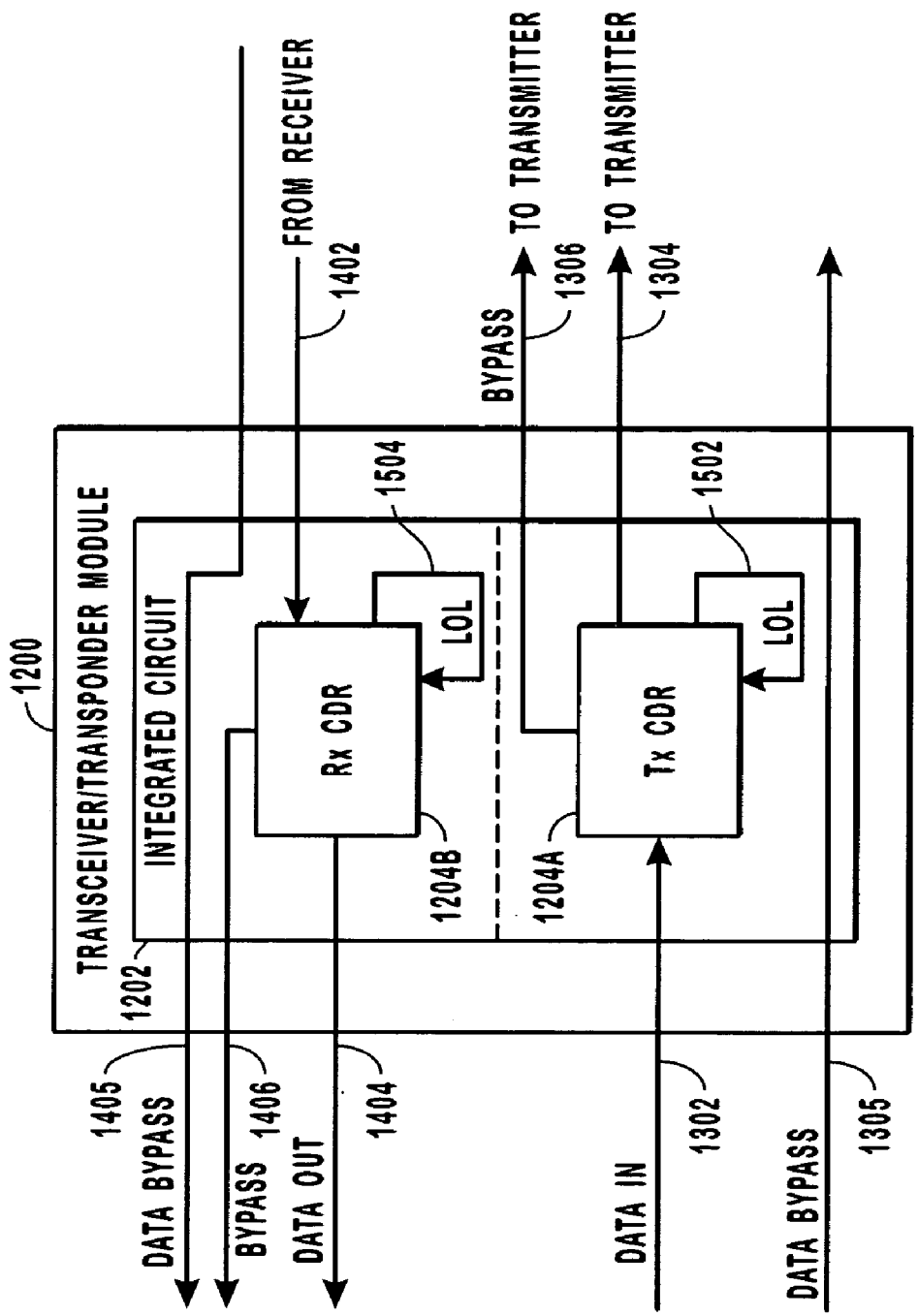
FIG. 4 is a block diagram of another implementation of a transceiver/transponder module that enables automatic selection of an operational data rate.

With more particular reference now to FIG. 3, the MUX 704 is configured to receive a data input 802 from the host 300 (see FIG. 1), as well as a reference clock input 804. In one example implementation, the reference clock input 804 comprises a parallel input clock or, alternatively, a Tx clock. In some implementations, MUX 704 and DEMUX 706 share the reference clock input 804, thereby reducing the amount of required circuitry on transceiver/transponder module 700. In addition to the foregoing, the MUX 704 generates a data output 806 to transmitter 208 (see FIG. 1). More particularly, parallel data from host device 300 (see FIG. 1) enters MUX 704 via data input 802. The MUX 704 then serializes the received data and transmits the data, as data output 806, to transmitter 208 (see FIG. 1).

With continuing reference to FIG. 3, the DEMUX 706 receives, on the receive path 202A, an input 902 from the receiver 204 (see FIG. 1). The DEMUX 706 also generates a data output 904. More particularly, serialized data enters DEMUX 706 from receiver 204 via data input 902. The MUX 706 then deserializes the received data and transmits the data, as data output 904, to transmitter 208 (see FIG. 1). As discussed in further detail below, 'data rate select' pins 1002 and 1004 couple the controller 708 to MUX 704 and DEMUX 706, respectively.

More particularly, the respective data rate select pins 1002 and 1004 enable automatic selection of an operational data rate. If the data rate of the input data stream 902 is out of the range of the selected data rate of MUX 704 and DEMUX 706, the MUX 704 and DEMUX 706, as applicable, generates a loss of lock ("LOL") signal on pins 1102 and/or 1104, as applicable. However, if MUX 704 or DEMUX 706 is locked, no LOL signal is generated for the respective CDR. In the example arrangement illustrated in FIG. 3, the controller 708, exemplarily implemented as a microprocessor controller, monitors MUX 704 and DEMUX 706 for a respective LOL signal on pins 1102 and/or 1104. The MUX 704 and DEMUX 706 can generate a LOL signal using a PLL or any other circuitry, system or device that indicates loss of lock on a signal.

In addition to implementing various monitoring functionalities, the controller 216 also provides control signals to the data rate select pins 1102 and 1104 of MUX 704 and DEMUX 706, respectively. In at least some implementations, the controller 708 maintains the current data rate as a default as long as there is no LOL signal transmitted on pins 1102 or 1104. However, in response to detecting LOL signal on pin 1102 or 1104, controller 708 resets the target data rate to test a new data rate. In the event that the LOL signal transmitted on pins 1102 or 1104 ceases, thereby indicating a correct selected data rate, controller 708 will maintain the new data rate.

On the other hand, if the LOL signal transmitted on pins 1102 or 1104 persists, the controller 708 tests another data rate. The process of sensing the LOL signal transmitted on pins 1102 or 1104 and resetting the data rate continues until either an appropriate data rate has been selected or all data rates have been attempted. In one embodiment, if all data rates generate a LOL signal, the data stream 802 and/or 904, as applicable, is passed through the IC 702 without a data rate change.

It should be noted that IC 702 may alternatively include a SERDES (not shown) with an automatically selectable data rate. In this alternative implementation, the SERDES is also configured to generate a LOL signal. Similar to the automatic selection of a data rate for a MUX/DEMUX implementation, the data rate of operation can be automatically selected using the LOL signal from the SERDES.

IV. Aspects of Example Controllerless CDR Signal Modification Circuitry

As noted elsewhere herein, at least some implementations of the invention are effective in implementing automatic data rate adjustment functionality without requiring an external controller or external control signal. Directing attention now to FIG. 4, details are provided concerning an example of such an implementation.

In particular, a transceiver/transponder 1200 is provided that has includes an IC 1202. Among other things, the IC 1202 includes a rate selectable transmitter Tx CDR 1204A and a rate selectable receiver Rx CDR 1204B. The transmitter rate selectable Tx CDR 1204A receives a data stream from host device 300 (see FIG. 1) by way of data pin 1302. The Tx CDR 1204A then transmits the data stream to transmitter 208 (see FIG. 1) via data output pin 1304, or alternatively, via bypass 1305. The bypass signal is indicated at 1306. Similarly, Rx CDR 1204B receives input data via input pin 1402 and transmits the data stream to host device 300 via output pin 1404 or, alternatively, bypass 1405. The bypass signal is indicated at 1406.

In the illustrated implementation, neither the rate selectable transmitter Tx CDR 1204A nor the rate selectable receiver Rx CDR 1204B is coupled to a controller or an external clock. Rather, in the illustrated embodiment, the Tx CDR 1204A and Rx CDR 1204B are configured to automatically select the proper data rate of operation without external control. More particularly, the Tx CDR 1204A and Rx CDR 1204B are configured to automatically detect a LOL 1502 and 1504, respectively, and automatically attempt various data rates of operation. If any of the selected data rates succeeds in stopping the LOL, then the Tx CDR 1204A and Rx CDR 1204B operate at the selected data rate. If LOL does not cease for any of the selected data rates, the Tx CDR 1204A and Rx CDR 1204B allows the input data stream to bypass the Tx CDR 1204A and Rx CDR 1204B.

Thus, because example embodiments of the transceiver/transponder module 1200 are self-contained so as to be able to implement data rate changes in environments where the host device does not include a clock or control input or other I/O or device for specifying data rate changes, embodiments of the invention can be implemented in systems conforming to a wide variety of different standards and protocols. As discussed below, embodiments of the CDR disclosed herein are useful in a wide variety of applications.

By way of example, eliminating the need for an external clock or oscillator correspondingly eliminates the need for certain I/O capabilities. While this aspect of example embodiments of the invention benefits manufacturers by reducing costs, this aspect also allows CDRs to be readily added to systems that do not support additional CDRs. For example, industry standards typically do not provide the necessary I/O for adding a CDR to an SFP or SFF type module. Specifically, adding a CDR to existing SFP or SFF type modules requires additional pin connects. Since the standard for SFP and SFF type modules has been set however, the connectors for these types of modules cannot be modified to accommodate additional pins.

However, embodiments of the CDR disclosed herein can readily be added to an existing SFP or SFF type module to perform various useful functions, such as eye opening for example. In one example embodiment and associated operational scenario, a 4 Gb/s Fibre Channel module is configured to run at 4, 2, or 1 Gb/s or lower. The eye opening functionality of the CDR is only used for higher data rates, such as rates of 2 Gb/s or 4 Gb/s. When the CDR detects a loss of lock signal, the CDR selects a data rate of about 4 Gb/s, and then about 2 Gb/s. If the loss of lock signal persists, the CDR determines that the operational data rate is slower than 2 Gb/s and takes itself offline.

V. Aspects of an Example Data Rate Selection Method

Figure 5:
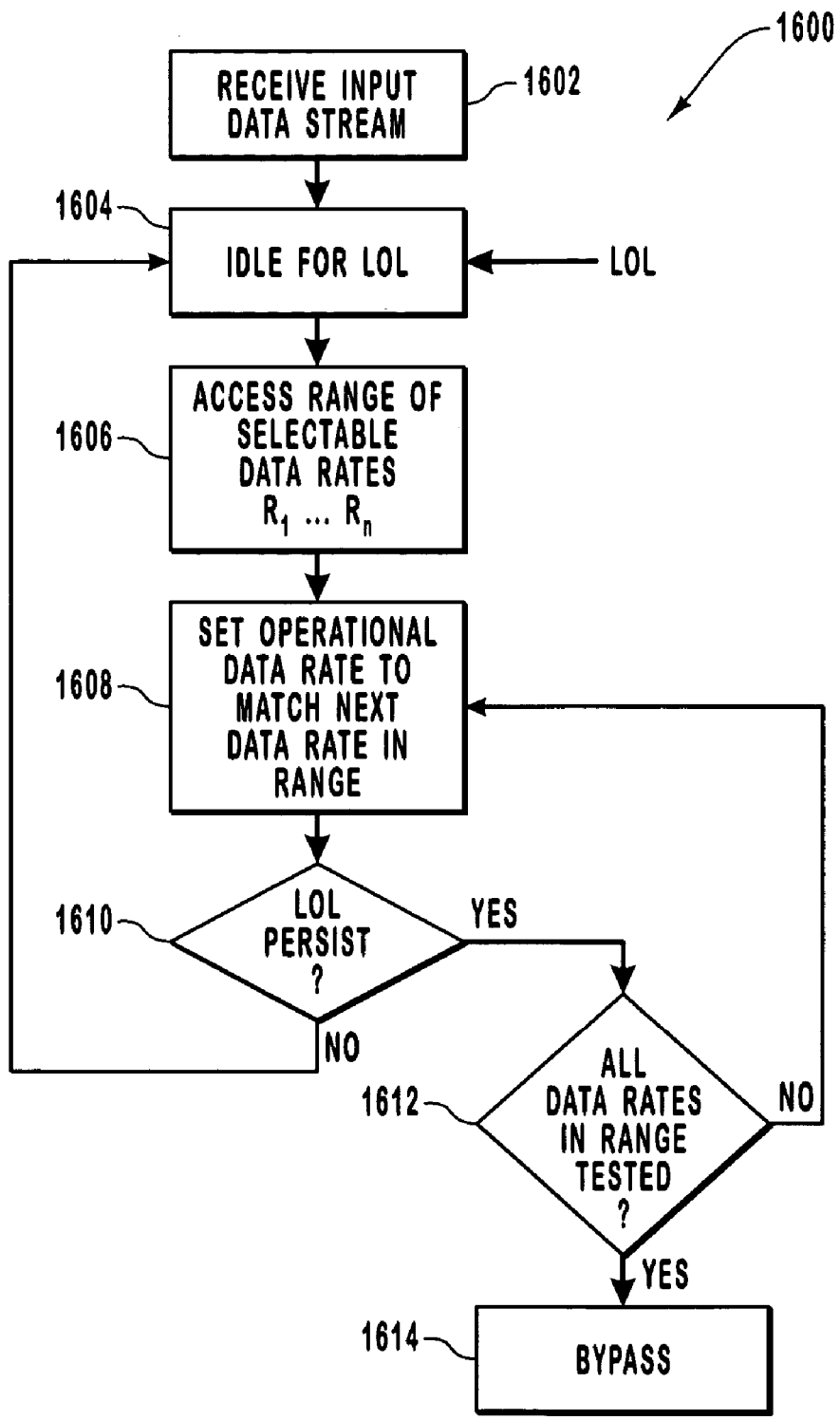
FIG. 5 is a flow chart illustrating one example of a method for providing automatic data rate selection.

The present invention also includes a method for automatically selecting the data rate of a transceiver/transponder. Directing attention now to FIG. 5, aspects of an example method 1600 for automatically selecting a data rate are indicated. At stage 1602, an input data stream having a data rate is received. The process 1600 then idles at stage 1604 unless and until a LOL signal, indicating that the data rate of the input data stream deviates from the selected data rate by a predetermined margin, is received.

Upon receipt of a LOL signal, the process 1600 then advances to stage 1606 where a predetermined range of selectable data rates $R_1 \ldots R_n$ associated with the transceiver/transponder or other device, is accessed. In two example alternative embodiments, a predetermined group of two or more discrete data rates, or a single predetermined selectable data rate, is accessed.

Next, the process 1600 advances to stage 1608 where the operational data rate is set to match the first, or next, data rate, as applicable, in the range. The process 1600 then proceeds to stage 1610 where a decision point is reached. In particular, if LOL persists, as would be the case where the new data rate of the CDR does not match the data rate of the input data stream, the process 1600 returns to stage 1608 to reset the data rate of the CDR to the next data rate in the range or group of selectable data rates $R_1 \ldots R_n$.

After each reset of the data rate, the process 1600 advances to stage 1612 where a determination is made as to whether all the data rates in the range have been test. If all of the data rates have not been tested, the process then repeats until a data rate has been set that causes deassertion of LOL. After LOL has been deasserted in response to the setting of a particular data rate, the process 1600 returns to stage 1604 for LOL idle.

It may be the case in some evolutions that none of the data rates in the range will cause the deassertion of LOL. Thus, in the event that the data rate of the CDR is set to every data rate in the range without causing deassertion of LOL, the process 1600 advances to stage 1610 where 'bypass' is set. At some point subsequent to the setting of 'bypass,' the process 1600 may be reset and return to stage 1604 for LOL idle.

VI. Alternative Embodiments Utilizing the 'Rate Select' Signal to Optimize Transceiver Operation In yet another example embodiment, manipulation of a so-called rate select signal (or an equivalent signal) is further utilized to influence the optimal operating parameters of an optoelectronic transceiver. For example, the Small Form Factor Multi-Source Agreement (SFP MSA) prescribes a specific functionality for the so-called 'Rate Select' signal. In particular, that standard defines the Rate Select signal as a selection between full or reduced receiver bandwidth. Present embodiments expand the response to the Rate Select signal to also include optimization of the transmitter's operational data rate by setting the appropriate Rate Select from the Host device.

In one example implementation, transmitter optimization is accomplished by manipulating the Rate Select signal so as to modify the average optical power and/or the optical modulation of the transmitter to meet the 4x Fibre Channel (4.25 Gb/s) and Gigabit Ethernet (1.25 Gb/s) optical requirements within the same transceiver. In this scenario, a laser used for 4x Fibre Channel applications requires a faster transition time between logic 0 and logic 1 light levels, as compared to a Gigabit Ethernet application, due simply to the significantly higher data rate. One method of achieving faster performance from a laser is for a laser driver to send more electrical current through it, which results in a higher optical power. Thus, when the Host signals the transceiver that it will be transmitting the faster data rates supported by the transceiver, by setting the Rate Select signal to a logic 1, the transceiver responds by increasing the optical power to achieve faster performance.

This ability to control the operational state of the transmitter depending on the operating environment gives rise to several advantages. For example, running at slower performance during Gigabit Ethernet operation (as opposed, for example, to a 4x Fibre Channel) by decreasing the optical power from the laser, provides the ability to more easily meet the Gigabit Ethernet requirement for minimum Extinction Ratio, known as ER. ER is the ratio of the logic 1 light level relative to no light versus the logic 0 light level relative to no light. An increase in average optical power requires more optical modulation current to maintain a constant ER. Thus, by keeping the average optical power lower, the laser driver does not need to supply as much modulation current to meet the Gigabit Ethernet ER requirement.

In direct contrast, an environment such as a 4x Fibre Channel does not have an ER requirement. Instead 4x Fibre Channel requires a minimum Optical Modulation Amplitude, known as OMA. OMA is the difference in the logic 1 light level and the logic 0 light level. Because OMA is not referenced to the no-light level like ER, it does not depend on the average optical power. This allows the transceiver to meet the 4x Fibre Channel OMA requirement at a significantly lower ER than the Gigabit Ethernet requirement.

Thus, by using the Rate Select signal provided by a Host, the transceiver is able to separate the faster transition time for 4x Fibre Channel from the ER requirement for Gigabit Ethernet. Thus it is not necessary to require the transceiver to simultaneously maintain a high optical power to get the needed speed, while also using an excessive amount of modulation current to meet a high ER requirement.

Figure 6:
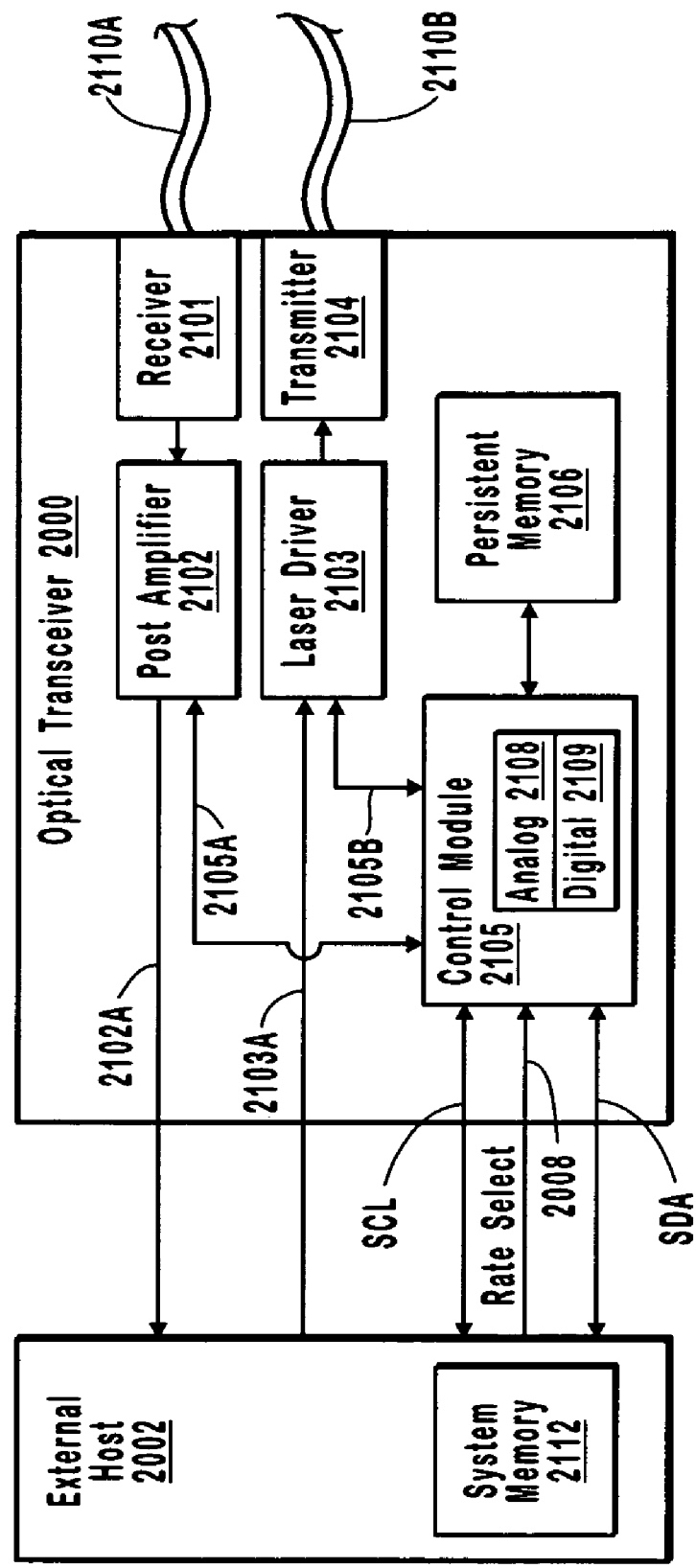
FIG. 6 is a block diagram illustrating another system environment for implemented yet another embodiment, wherein a rate select is provided by a host so as to adjust operational characteristics of an optoelectronic transceiver module.

Reference is now made to FIG. 6, which illustrates certain features of an optical transceiver 2000 in which aspects of the present invention may be employed. Note that many of the features of the transceiver 2000 have been previously described, and that discussion will not be repeated. Also, example transceiver 2000 is described by way of illustration only, and not by way of restricting the scope of the invention. Related details pertaining to an example transceiver environment can be found in co-pending U.S. provisional patent application Ser. No. 60/530,036, filed on Dec. 15, 2003 and entitled "Optical Transceiver Control Chip with Temperature Compensation and Digital Diagnostics," which is incorporated by reference herein in its entirety.

Aspects of this embodiment allow for manipulation of various operating behaviors of the transceiver 2000 based on the level of a 'rate select' signal that, for example, can be provided by an external host (denoted here in FIG. 6 at 2002). In other embodiments, the rate select signal (or its equivalent) can be automatically generated as previously described. While the example embodiment may be described in connection with a particular operating environment for purposes of illustration, it will be appreciated that principles of the present invention are suitable for 1 G, 2 G, 4 G, 10 G and higher data rates as sensitivity to operational circumstances increases. Furthermore, the principles of the present invention may be implemented in laser transmitter/receivers of any form factor such as XFP, SFP and SFF, without restriction. Having said this, the principles of the present invention are not limited to a laser transceiver environment at all.

With continued reference to FIG. 6, the optical transceiver 2000 receives an optical signal from fiber 2110A using receiver 2101. The receiver 2101 acts as an optoelectric transducer by transforming the optical signal into an electrical signal. The receiver 2101 provides the resulting electrical signal to a post-amplifier 2102. The post-amplifier 2102 amplifies the signal and provides the amplified signal to the external host 2002 as represented by arrow 2102A. The external host may be any computing system capable of communicating with the optical transceiver 2000. In one embodiment, the optical transceiver 2000 may be a printed circuit board or other chip within the host 2002, although this is not required.

The optical transceiver 2000 may also receive electrical signals from the host 2002 for transmission onto the fiber 2110B. Specifically, the laser driver 2103 receives the electrical signal as represented by the arrow 2103A, and drives the transmitter 2104 (e.g., a laser or Light Emitting Diode (LED)) with signals that cause the transmitter 2104 to emit onto the fiber 2110B optical signals representative of the information in the electrical signal provided by the host 2002. Accordingly, the transmitter 2104 serves as an electro-optic transducer.

The behavior of the receiver 2101, the post-amplifier 2102, the laser driver 2103, and the transmitter 2104 may vary dynamically due to a number of factors. For example, temperature changes, power fluctuations, and feedback conditions may each affect the performance and/or required operating parameters of these components. Accordingly, the laser transmitter/receiver 2000 includes a control module 2105, which may evaluate temperature and voltage conditions and other operational circumstances, and receives information from the post-amplifier 2102 (as represented by arrow 2105A) and from the laser driver 2103 (as represented by arrow 2105B). This allows the control module 105 to counteract the dynamically varying performance, and detect when there is a loss of signal.

Specifically, the control module 2105 may counteract these changes by adjusting settings on the post-amplifier 2102 and/or the laser driver 2103 as represented by the arrows 2105A and 2105B. In the context of the discussion above, and as will be further described below, the laser driver 2103 may be adjusted in accordance with the 'Rate Select' signal, denoted at 2008, that is supplied by the host 2002 to the control module. Additional details regarding control and manipulation of an optical transmitter are further shown and discussed, for example, in co-pending U.S. patent application Ser. No. 10/784,565, filed on Feb. 23, 2004 and entitled "System and Method for Control of Optical Transmitter," and U.S. Ser. No. 10/704,096, filed on Nov. 6, 2003 and entitled "Control for Peaking of Laser Driver to Improve Eye Quality." Those applications are incorporated herein by reference in their entirety.

In the illustrated example, the control module 2105 may have access to a persistent memory 2106, which in one embodiment, is an Electrically Erasable and Programmable Read Only Memory (EEPROM). Data and clock signals may be provided from the host 2002 to the control module 2105 using the serial clock line SCL, and the serial data line SDA. Also data may be provided from the control module 2105 to the host 2002 using serial data signal SDA to allow for digital diagnostics and readings of temperature levels, transmit/receiver power levels, and the like. In one embodiment, the control module 2105 provides operational information using this data signal SDA to the host 2002, so that the host 2002 may then log the information into its own persistent memory 2112. Also, as is shown in FIG. 6, one of the signals provided to the control module 2105 from the host is a 'Rate Select' signal designated at 2008. While this signal has a particular definition and meaning per certain industry standards (such as the Small Form Factor Multi-Source Agreement), it will be appreciated that the current invention is not limited to that specific signal notation, but applies equally to any equivalent signal or set of signals that provide a similar control function—e.g., indicating a change in data rate.

In the example shown, the control module 2105 includes both an analog portion 2108 and a digital portion 2109. Together, they allow the control module to implement logic digitally, while still largely interfacing with the rest of the optical transceiver 100 using analog signals. However, it will be appreciated that the control module could be implemented in any one of a number of different ways within hardware and/or software, including various programmable devices, analog circuitry, etc. For purposes of the present description, the control module 2105 includes a suitable programmable device, as well as digital and analog circuitry needed to appropriately interact with and control the laser driver 2103. For example, the analog portion 2108 may contain digital to analog converters, and analog to digital converters, high speed comparators (e.g., for event detection), voltage based reset generators, voltage regulators, voltage references, clock generator, and other analog components. The digital portion 2109 of the control module 2105 may include a timer module 202 that provides various timing signals used by the digital portion 2109. Such timing signals may include, for example, programmable processor times. In addition, the digital portion may include one or more general-purpose programmable processors. The processor(s) recognize instructions that follow a particular instruction set, and may perform normal general-purpose operation such as shifting, branching, adding, subtracting, multiplying, dividing, Boolean operations, comparison operations, and the like. In one embodiment, the general-purpose processors are each a 16-bit processor and may be identically structured. The precise structure of the instruction set is not important to the principles of the present invention as the instruction set may be optimized around a particular hardware environment, and as the precise hardware environment is not important to the principles of the present invention.

Figure 7:
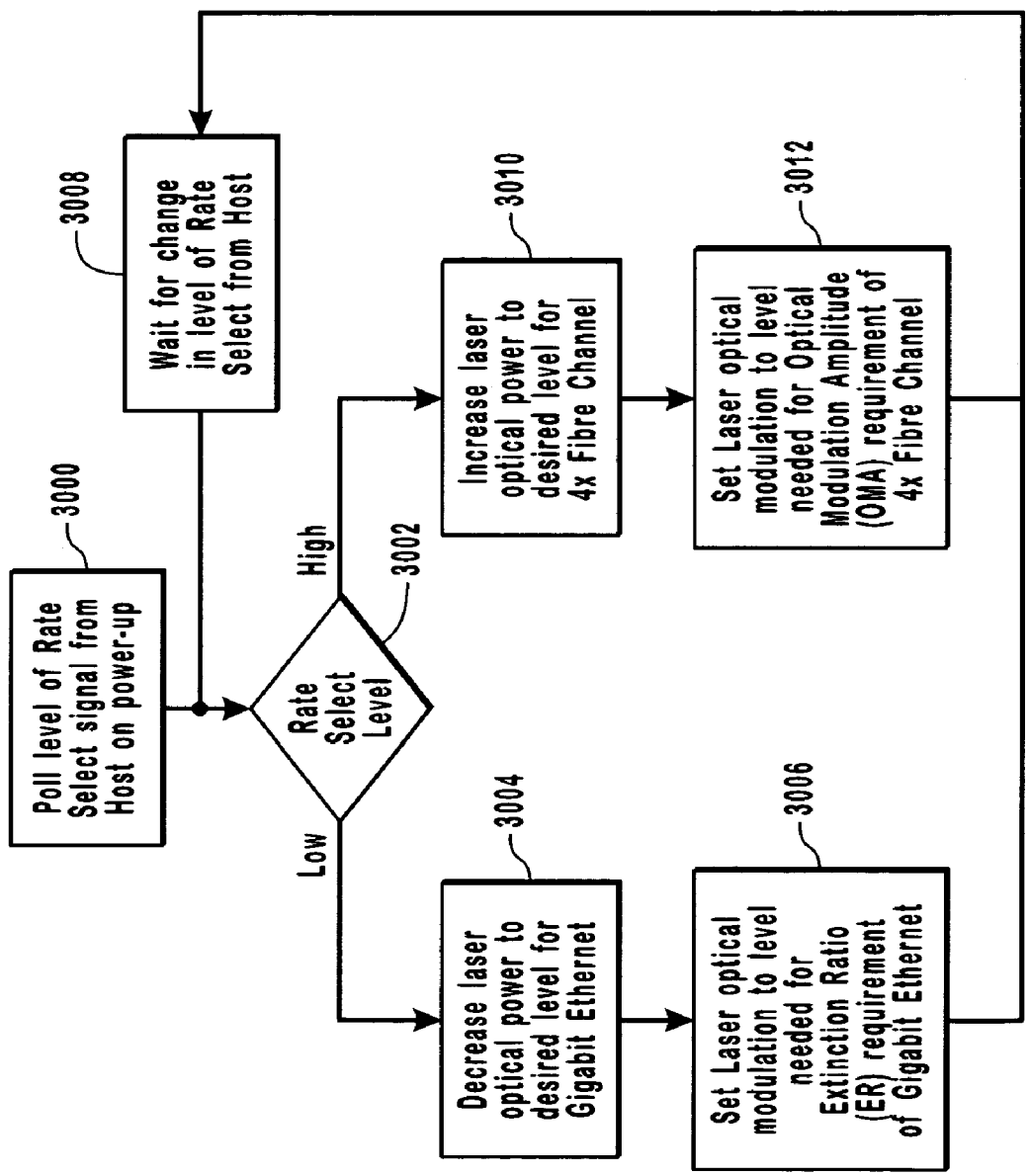
FIG. 7 is a flow chart illustrating one example of a method for controlling operational characteristics of the module via a rate select signal.

Reference is next made to FIG. 7, which is a flow chart illustrating one example of a methodology that could be used to adjust the operating parameters of a transceiver module, such as that shown in FIG. 6, by way of a rate select-type of signal from a host. The method steps illustrated in FIG. 7 are preferably implemented by way of software executing within a programmable device, such as might be implemented in the controller module 2105. Thus, beginning at step 3000, at power up or some other initialization state, the controller 2105 polls the assertion level of the 'rate select' signal (2008 in FIG. 6) or its equivalent. At step 3002, it is determined if the assertion is "high" (indicating, for example, a higher transmission rate environment such as 4x Fibre Channel) or "low" (indicating, for example, a lower transmission rate environment, such as Gigabit Ethernet).

If at step 3002 it is determined that rate select corresponds to a "low" state, then processing continues at program step 3004. At this step, the controller module 2105 interacts with the laser driver circuit (2103 in FIG. 6) so as to decrease the level of current supplied and thereby decrease the optical power generated by the transmitter laser (2104 in FIG. 6) to a level corresponding to, for example, a Gigabit Ethernet environment. Processing then continues at step 3006, where the controller 2105 further interacts with the laser driver so as to set the transmission laser optical modulation level to a level needed to achieve an extinction ration (ER) that corresponds to that which is required for a Gigabit Ethernet environment. At this point, the operational characteristics of the optical transceiver 2000 have been configured—in response to the rate select signal from a host—to be optimally configured for use in a Gigabit Ethernet environment.

If at step 3002 it is instead determined that the rate select signal level from the host corresponds to a "high" state, then processing continues at step 3010. At this step, the controller module 2105 interacts with the laser driver circuit (2103 in FIG. 6) so as to increase the level of current supplied and thereby increase the optical power generated by the transmitter laser (2104 in FIG. 6) to a level corresponding to, for example, a 4x Fibre Channel environment. Processing then continues at step 3012, where the controller 2105 further interacts with the laser driver so as to set the transmission laser optical modulation level to a level needed to achieve an Optical Modulation Amplitude (OMA) that corresponds to that which is required for a 4x Fibre Channel environment. At this point, the operational characteristics of the optical transceiver 2000 have been configured—in response to the rate select signal from a host—to be optimally configured for use in a 4x Fibre channel environment.

Following execution of steps 3006 or 3012, processing then continues at program step 3008. At this step, the control module will 2105 monitor the rate select signal state. If the host changes the level of the signal so as to indicate a new environment, processing will then proceed at step 3002 and continued in the manner described above.

It will be appreciated that the above methodology has been described with respect to specific operating environments—here, Gigabit Ethernet and 4x Fibre Channel. However, this is done only for purposes of illustration, and the process would apply equally to other operating environments. Further, while the illustrated example is described in the context of adjusting the signal power and modulation of a laser transmitter, it will be appreciated that any one of a number of different operating characteristics could be altered in response to a rate select-type of signal from the host. For example, in addition to (or in lieu of) changing the dc drive current and the ac modulation current of the transmission laser, the rate select signal could be monitored to boost the electrical receive eye amplitude of a transceiver module when appropriate. Alternatively, the rate select signal could be used to alter the threshold of the "loss of signal" (LOS); for example, two (or more) threshold levels for a LOS could be implemented—at a lower data rate the LOS does not have to be asserted until a lower light power level is presented. Again, the primary objective is to optimize operating characteristics of the transceiver based on a data rate condition.

Further, while the above embodiment is described as implementing a change in response to a rate select signal that is received from a host device, that change could instead be automatically detected, such as has been described in previously described embodiments above.

VII. General Aspects of Software

As disclosed elsewhere herein, aspects of implementations of the invention may be implemented by way of various computing devices and associated software. Such computing devices may comprise a special purpose or general purpose computer that includes various computer hardware, as discussed in greater detail below.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, or special purpose processing device to perform a certain function or group of functions.

The following discussion is intended to provide a brief, general description of an example computing environment in which aspects of example embodiments of the invention may be implemented. Although not required, aspects of the invention may be described in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of the program code means for executing steps of the methods disclosed herein. The particular sequence of such executable instructions or associated content structures represent examples of corresponding acts for implementing the functions described in such steps.

Of course, the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment for example, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transceiver module, comprising:
   an optical transmitter assembly including a laser device configured to produce an optical signal in response to a laser current;
   a laser driver circuit configured to produce the laser current for use by the optical transmitter;
   an optical receiver assembly; and
   a controller circuit configured to receive a rate select signal that indicates a plurality of operational data rates for the optical transmitter assembly, and that is configured to generate at least one control signal for use by the laser driver circuit, wherein the at least one control signal causes a modulation light level of the optical signal to be set according to the operational data rate indicated by the rate select signal.

2. An optical transceiver module as defined in claim 1, wherein the rate select signal is received from an external host device.

3. An optical transceiver module as defined in claim 1, wherein the module is compatible with an operational data rate as dictated by at least one of: 2 gigabits per second Fibre Channel systems; 4 gigabits per second Fibre Channel systems; and Gigabit Ethernet.

4. An optical transceiver module as defined in claim 1, wherein the module is compatible with an operational data rates greater than approximately 1 gigabits per second.

5. An optical transceiver module as defined in claim 1, wherein the modulation light level is set at a level needed to satisfy a predefined Extinction Ratio (ER) level.

6. An optical transceiver module as defined in claim 1, wherein the modulation light level is set at a level needed to satisfy a predefined Optical Modulation Amplitude (OMA) level.

7. An optical communications system, the system comprising:
   a host device; and
   an optical transceiver module as set forth in claim 1.

8. An optical transceiver module as defined in claim 1, wherein the rate select signal is generated by a detection circuit present within the optical transceiver module.

9. An optical transceiver module as defined in claim 8, wherein the detection circuit comprises one of:
   a clock and data recover integrated circuit;
   a multiplexer/demultiplexer integrated circuit; and
   a serializer/deserializer integrated circuit.

10. An optical transceiver module as defined in claim 1, wherein the modulation light level caused to be set according to the operational data rate is a first modulation light level and wherein the at least one control signal causes a second modulation light level to be set according to the operational data rate, the first and second modulation light levels corresponding to first and second logic levels in the optical signal, respectively.

11. An optical transceiver module as defined in claim 10, wherein the first and second modulation light levels are caused to be set such that a difference between the modulation light levels meets an optical modulation level requirement associated with the operational data rate.

12. An optical transceiver module, comprising:
   an optical transmitter assembly including a laser device configured to produce an optical signal in response to a laser current that is representative of information in an electrical signal;
   a laser driver circuit having a first input to receive the electrical signal and a second input to receive a control signal, the laser driver circuit being configured to produce the laser current for use by the optical transmitter in response to the electrical signal;
   an optical receiver assembly; and
   a controller circuit configured to receive a rate select signal that indicates one of a plurality of operational data rates for the optical transmitter assembly,
   wherein the controller circuit is configured to generate the control signal and wherein the control signal controls the laser driver circuit to cause a modulation light level of the optical signal to be set according to the operational data rate indicated by the rate select signal.

13. An optical transceiver module as defined in claim 12, wherein the rate select signal is received from a source external to the optical transceiver module.

* * * * *